United States Patent [19]

Sano et al.

[11] Patent Number: 5,500,564
[45] Date of Patent: Mar. 19, 1996

[54] ELECTRIC MOTOR WITH ROTATION DETECTING MECHANISM

[75] Inventors: Manabu Sano; Shuji Sekine, both of Yokohama, Japan

[73] Assignee: Jidosha Denki Kogyo Kabushiki Kaisha, Yokohama, Japan

[21] Appl. No.: 321,525

[22] Filed: Oct. 12, 1994

[30] Foreign Application Priority Data

Oct. 14, 1993 [JP] Japan ................. 5-055613 U

[51] Int. Cl.⁶ .................................................. H02K 7/10
[52] U.S. Cl. ........................................... 310/83; 310/68 B
[58] Field of Search ................... 310/66, 67 R, 310/68 R, 68 B, 68 E, 80, 83, 84, 89, 40 MM, 40 R

[56] References Cited

U.S. PATENT DOCUMENTS 4,935,652  6/1990  Maxa ..................... 310/68 B
5,184,038  2/1993  Matsui et al. ............ 310/68 B X
5,272,402  12/1993  Blaser et al. ............ 310/68 B
5,291,130  3/1994  Kendzior ............... 301/68 B X Primary Examiner—Mark O. Budd
Attorney, Agent, or Firm—Sughrue, Mion, Zinn, Macpeak & Seas

[57] ABSTRACT

An electric motor is provided with an armature, an output shaft rotatable according to the rotation of the amature through a worm gear pair, and a rotation detectiong mechanism which comprises a rotary magnet rotatable together with the output shaft through an intervenient member and a reed switch for detecting rotation of the output shaft according to alterarion of the magnetic force caused by the rotation of the rotary magnet, and the intervenient member is fixed to the output shaft so as to form a predetermined play between the output shaft and the rotary magnet and transmit the rotation of the output shaft to the rotary magnet through the play.

8 Claims, 4 Drawing Sheets

ELECTRIC MOTOR WITH ROTATION DETECTING MECHANISM

BACKGROUND OF THE INVENTION

1. Field of the Invention

This invention relates to an electric motor used, for example, for driving a seat of a power seat apparatus of an automotive vehicle and, more particularly to a motor with a built-in rotation detecting mechanism for detecting the position of the seat correlatively according to the number of rotations of an output shaft of the electric motor.

2. Description of the Prior Art

There has been known an electric motor shown in FIG. 4 as an electric motor housed with a rotation detecting mechanism for driving the seat and detecting the present position of the seat correlatively according to the rotation of the motor in the power seat apparatus of the automotive vehicle.

An illustrated electric motor 50 is provided with an armature 52 in a motor case 51, a worm 53a formed on a shaft 53 of the armature 52 is meshed with a worm wheel 54, and the worm wheel 54 is secured through a cross-shaped plate 62 to an output shaft 57 supported rotatably by a bearing 56 disposed in a gear case 55. The output shaft 57 is secured with an output gear 58 on the outside of the gear case 55.

According to electric supply to the armature 52, the worm wheel 54 rotates by the rotary power of the armature 52 and the output gear 58 rotates by the rotation of the worm wheel 54 through the cross-shaped plate 62 and the output shaft 57, thereby tilting forward or backward the seat back connected to the output shaft 57 through the output gear 58.

The output shaft 57 is secured with a wheel-shaped magnet 59 which is polarized with south and north poles alternately on the outer periphery thereof, and a reed switch 60 is attached on a gear case cover 61 covering the opening side of the gear case 55 so as to be sited at a predetermined distance away from the outer periphery of the magnet 59.

When the output shaft 57 rotates according to the rotation of the armature 52, the magnet 59 rotates together with the output shaft 57, whereby the reed switch 60 disposed on the outer side of the magnet 59 becomes on then off alternatingly according to alteration of the magnetic force caused by the rotation of the magnet 59. And a controller (not shown) detects the position of the seat or the tilt angle of the seat back by counting the number of pulses generated from the reed switch 60 repeating on and off states alternatingly.

However, since the magnet 59 is secured to the output shaft 57 in the conventional electric motor 50 as mentioned above, if there is a play in the magnet 59 or the output shaft 57 in the rotational direction due to a gap between the magnet and the output shaft 57, a backlash between the worm wheel 54 and the worm 53a of the armature shaft 53, or a play of the armature shaft 53 in the longtitudinal direction, there is the possibility that the pulse signal is generated from the reed switch 60 in response to the small turn of the magnet 59 caused by the play of the magnet 59 or the output shaft 57 even when the output shaft 57 does not rotate. In such a case, there is a problem in that error appears between the actual seat position and the seat position obtained by detecting the rotation of the output shaft 57 of the electric motor 50 through the reed switch 60 and the magnet 59.

SUMMARY OF THE INVENTION

This invention is directed to solve the aforementioned problem of the Prior Art, and it is an object to provide an electric motor with a built-in rotation detecting mechanism which is possible to detect the rotation of the output shaft very accurately even if there is a play at the output shaft.

The construction of the electric motor according to this invention in order to accomplish the abovementioned object is characterized by comprising a motor case fixed with a field magnet on an inner periphery thereof, an armature provided with a shaft formed with a worm and rotatably supported in the motor case at one end thereof, a gear case connected to the motor case and rotatably supporting another end of the shaft of the armature, a gear cover disposed to cover an opening part of the gear case, an output shaft rotatably supported in the gear case, a worm wheel secured to the output shaft and housed in the gear case rotatably to be meshed with the worm formed on the shaft of the armature, a rotary magnet disposed on the gear cover rotatably about a coaxial line of the output shaft, a rotation detector for detecting rotation of the output shaft according to alteration of magnetic force caused by rotation of the rotary magnet, and an intervenient member existing between the output shaft and the rotary magnet for forming a predetermined play between the output shaft and the rotary magnet and for transmitting the rotation of the output shaft to the rotary magnet through the play.

In an embodiment of the electric motor according to this invention, it is preferable to form the predetermined play between the output shaft and the rotary magnet larger than a play of the output shaft. The intervenient member may be fixed to the output shaft or the worm wheel and engaged with the rotary magnet through the predetermined play in other embodiments to be adopted according to demand. The rotary magnet may be provided with an engaging part to be engaged with the intervenient member through the predetermined play in another embodiment to be adopted according to demand. Furthermore, the rotary magnet may be provided with a plurality of engaging parts at a predetermined space round the circumference thereof, and the intervenient member may be provided with at least one of projection to be engaged with one of the engaging parts of the rotary magnet through the predetermined play in a circumferential direction of the rotary magnet in the other embodiment to be adopted according to demand. The gear cover may be formed with a magnet supporting shaft and the rotary magnet may be attached rotatably on the gear cover by fitting a wave washer and a stop ring onto the magnet supporting shaft of the gear cover in the other embodiment to be adopted according to demand. Additionally, the intervenient member may be formed with an oval hole and the output shaft may be formed with an oval cutting part having an oval shaped section to be inserted into the oval shaped hole of the intervenient member.

In the electric motor according to this invention, the rotary magnet is disposed rotatably on the gear cover attached with the rotation detector and so designed as to be engaged with the output shaft through the intervenient member existing between the output, shaft and the rotary magnet, and there is the play having a predetermined length between the output shaft and the rotary magnet. Therefore, by forming the play between the output shaft and the rotary magnet larger than a play of the output shaft in the rotational direction, the rotary magnet does not rotate substantially even if the output shaft rotates as much as an amount corresponding to the play in the output shaft, so that, the pulse signal is never generated from the rotation detector more than one time even if the pulse signal may be generated one time according to the small turn of the output shaft caused by the play of the output shaft.

DESCRIPTION OF THE PREFERRED EMBODIMENT

Figure 1:
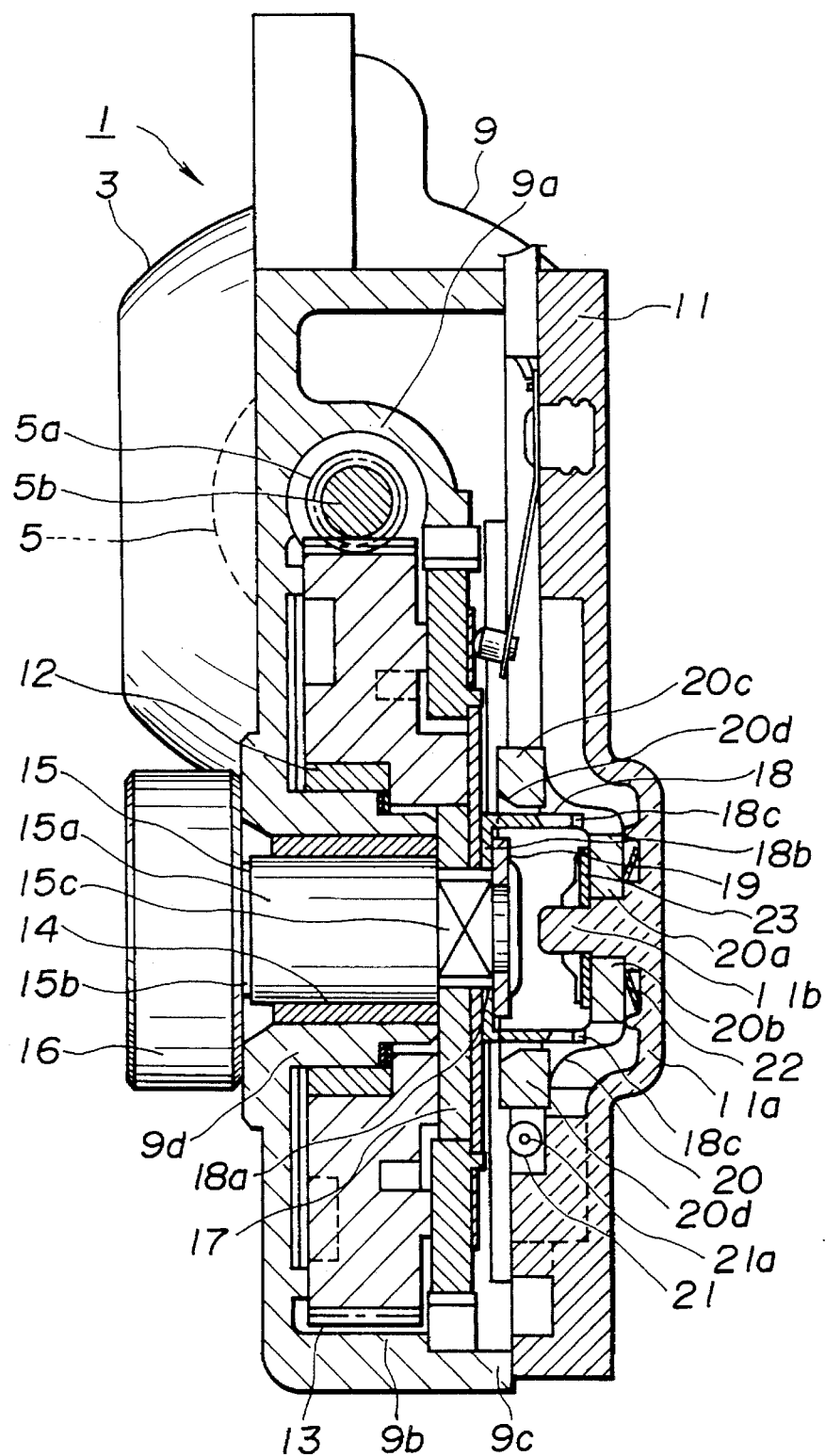
FIG. 1 is a vertical sectional front view of an electric motor according to this invention.

An embodiment of the electric motor according to this invention will be described below on basis of FIG. 1 to FIG. 3.

In an electric motor 1 shown in the drawings, an armature 5 is rotatably housed in a bottomed cylindrical shaped motor case 3 which is secured with a field magnet 4 on the inner peripheral face thereof. The armature 5 comprises an armature shaft 5b, an armature coil 6 wound around an iron core fixed on the armature shaft 5b and, a commutator 7 disposed on the armature shaft 5b and electrically connected to the armature coil 6. And a motor section 2 is formed by the field magnet 4, the armature 5 and brushes 8, 8 for electric supply to the armature coil 6 through the commutator 7 of the armature 5. The armature 5 rotates according to the electric supply to the armature coil 6 from an external power circuit (not shown) through the brushes 8, 8 and the commutator 7. The armature shaft 5b extrudes into a gear case 9 (which will be described below) as shown in FIG. 2.

The motor case 3 is attached with the gear case 9 by screwing screws 10, 10 at an opening thereof, the armature shaft 5b is inserted in a shaft hole 9a bored in the gear case 9 and formed with a worm 5a thereon.

Figure 2:
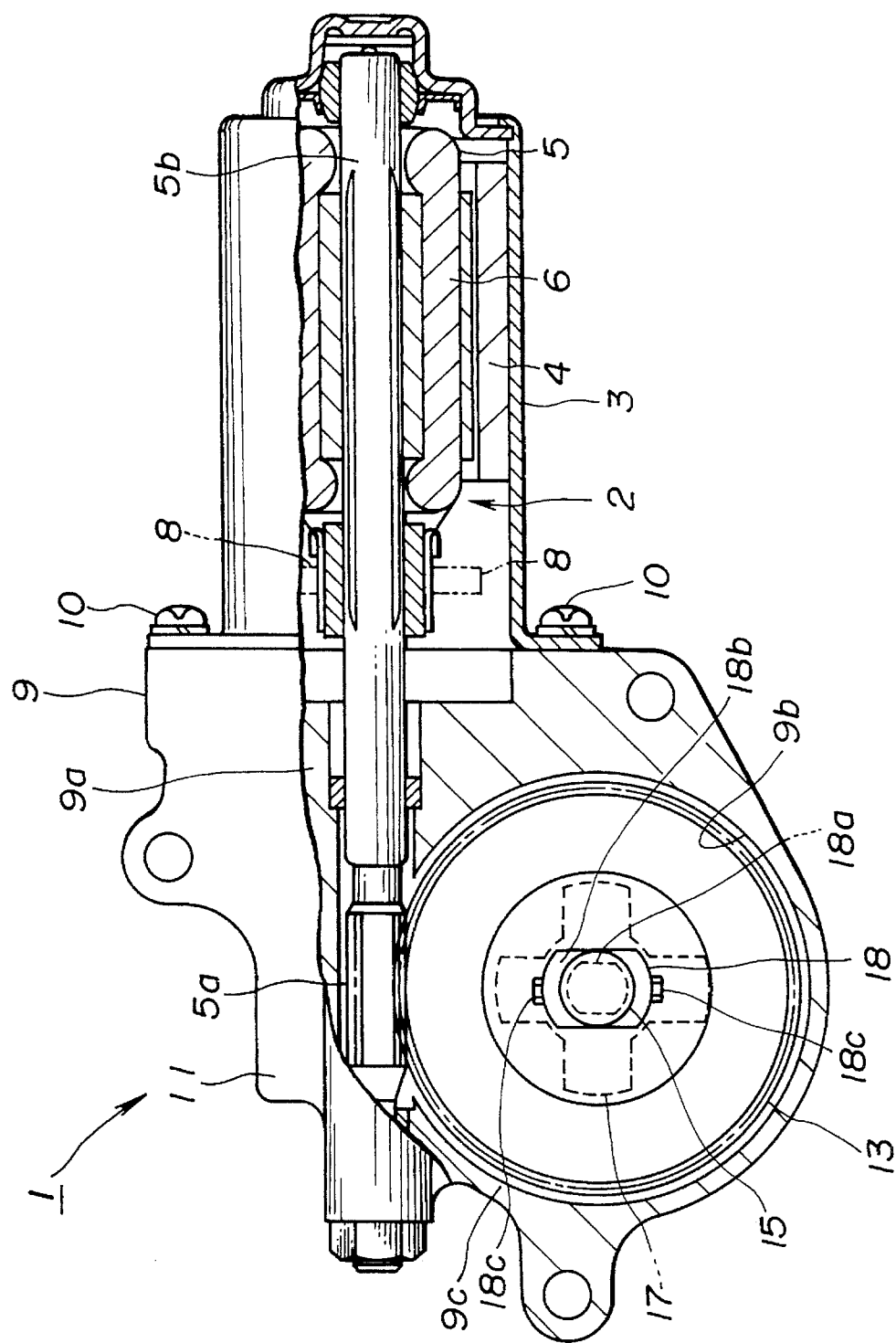
FIG. 2 is a partially sectional side view of the electric motor shown in FIG. 1.

The gear case 9 is provided with a circularly hollow-shaped gear chamber 9b which opens on the right side in FIG. 1, and disposed with a gear cover 11 so as to cover an opening 9c of the gear chamber 9b thereof. The gear case 9 is also provided with a hollow cylindrical shaped worm wheel shaft 9d in the center of the gear chamber 9b and the worm wheel shaft 9d is rotatably inserted with a worm wheel 13 through a first bearing 12. The worm wheel 13 is so disposed as to be meshed with the worm 5a of the armature shaft 5b and rotate in the gear case 9 according to the rotation of the armature 5. An output shaft 15 is inserted rotatably into the hollow of worm wheel shaft 9d through a second bearing 14.

The output shaft 15 is supported by the second bearing 14 at a shaft body 15a and fixed with an output gear 16 at a top end 15b extruding from the gear case 9. On the opposite end of the output shaft 15, a cross-shaped plate 17 is attached not rotatably by fitting an oval shaped hole 17a bored in the plate 17 onto an oval cutting part 15c having an oval shaped section of the output shaft 15, and fingers of the cross-shaped plate 17 are engaged with plate fitting parts 13b of the worm wheel 13. Therefore, the output shaft 15 and the output gear 16 are so structured as to rotate together with the worm wheel 13.

The output shaft 15 is also attached with an intervenient member 18 not rotatably on the oval cutting part 15c by fitting the oval hole 18a bored in the center part of the intervenient member 18 onto the oval cutting part 15c together with a washer 19.

The intervenient member 18 is provided with a pair of projections 18c, 18c standing out upwardly from both the end of a base 18b of the intervenient member 18 formed with the oval hole 18a. The projections 18c, 18c stand out toward the gear cover 11 attached to the gear case 9, and the intervenient member 18 rotates together with the output shaft 15. Additionally, the intervenient member 18 may be fixed to the worm wheel 13 or the cross-shaped plate 17 directly.

On the other side, the gear cover 11 covering the opening 9c of the gear case 9 is formed with a magnet containing cavity 11a depressed toward the opposite side of the gear case 9 in the nearly center part thereof, the gear cover 11 is provided with a magnet supporting shaft 11b projecting forward the side of the gear case 9 at the center of the magnet containing cavity 11a, and the magnet supporting shaft 11b is rotatably fitted with a rotary magnet 20 thereonto. Furthermore, the gear case 11 is disposed with a reed switch 21 as a rotation detector on the side of the magnet containing cavity 11a, the reed switch 21 is fixed on the gear case 11 at a predetermined distance from the rotary magnet 20 and so designed as to repeatedly make and break electrical contact between lead wires 21a and 21b according to alteration of the magnetic force caused by the rotation of the rotary magnet 20.

Figure 3:
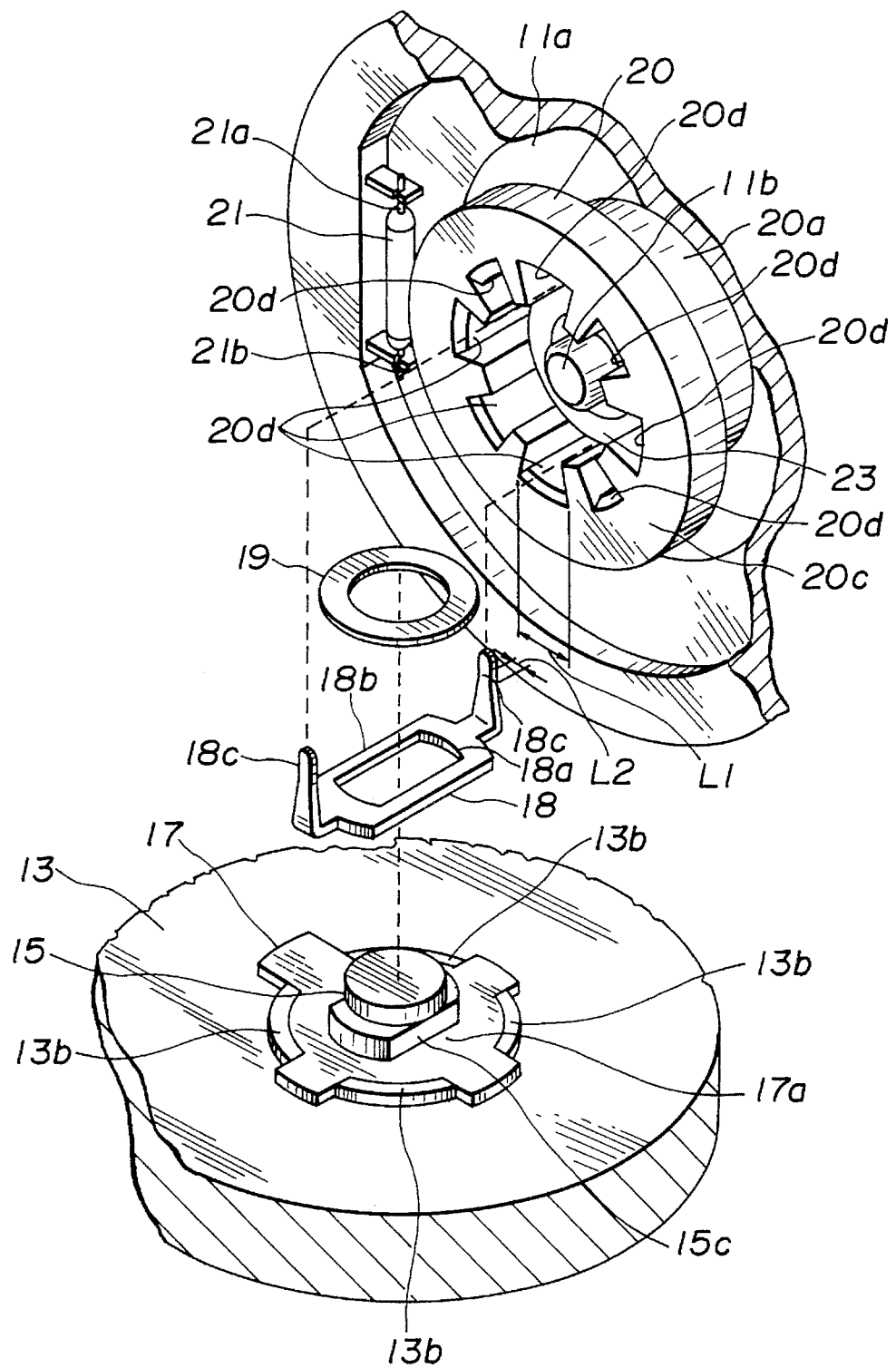
FIG. 3 is a perspective view illustrating relative position between a rotary magnet and an intervenient member of the electric motor shown in FIG. 1.
Figure 4:
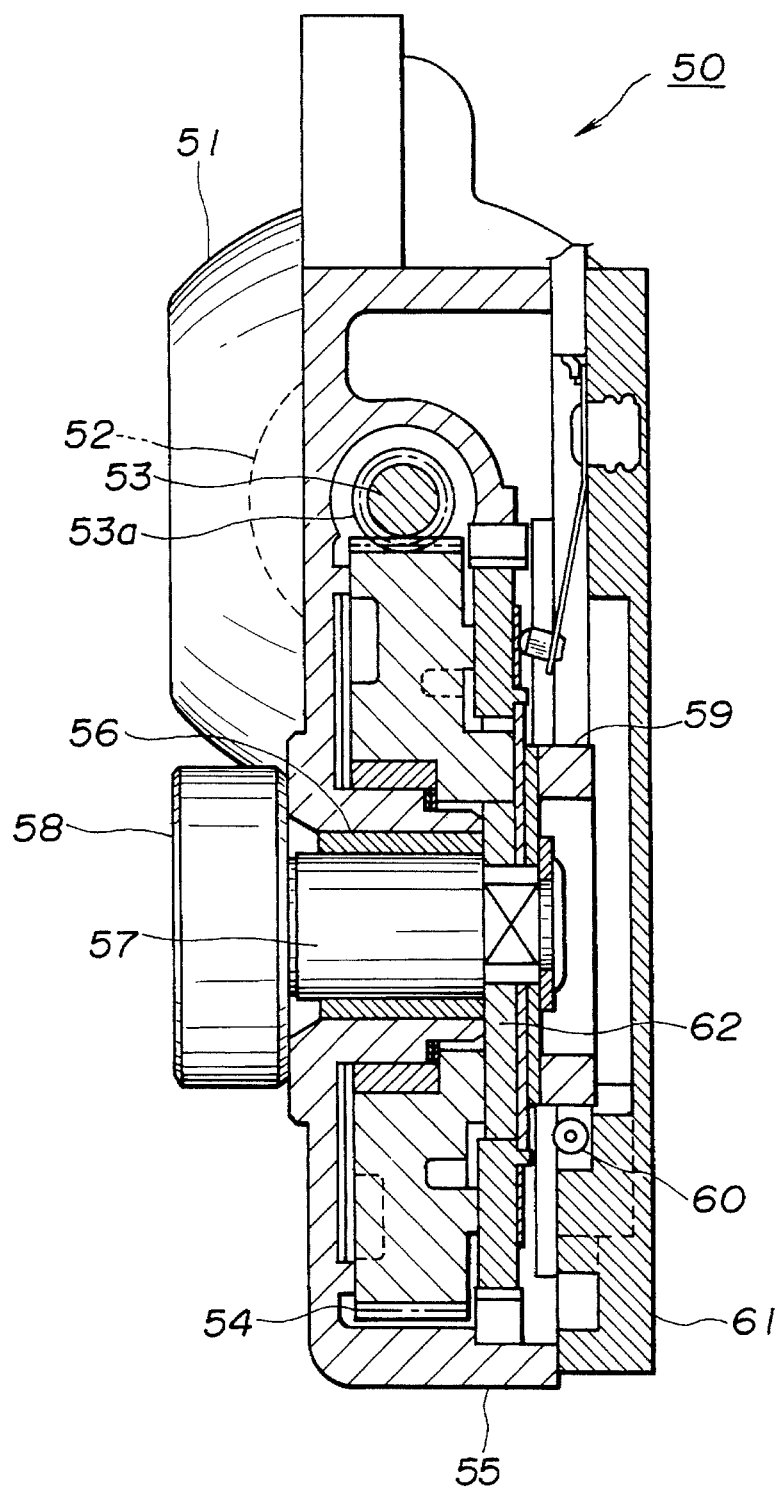
FIG. 4 is a vertical sectional front view of a conventional electric motor with a rotation detecting mechanism.

The rotary magnet 20 is formed into a bowl-like shape by binding magnetic powder with resin as shown in FIG. 3 and composed of a base 20a forming the center part of the rotary magnet 20 and an annular flange 20c overhanging outwardly from the base 20a. The rotary magnet 20 is disposed on the gear case 11 so as to rotate and not to drop off the magnet supporting shaft 11b by fitting a center hole 20b bored in the base 20a onto the shaft 11b together with a wave washer 22 and a stop ring 23. Further, the rotary magnet 20 is polarized with south and north poles alternately on the outer periphery of the annular flange 20c thereof, and provided with a plurality of engaging parts 20d cut out on the inner periphery of the annular flange 20c at predetermined spaces from each other. The engaging parts 20d are formed so as to be inserted with the projections 18c of the intervenient member 18.

In this case, each length L1 of the engaging parts 20d of the rotary magnet 20 in the rotational direction is formed larger than each length L2 of the projections 18c of the intervenient member 18 in the same direction, accordingly a space having a predetermined length of L3 (=L1−L2) is formed between the projection 18c of the intervenient member 18 and the engaging part 20d of the rotary magnet 18. Namely, the rotary magnet 18 is so designed as not to rotate until the engaging parts 20d of the rotary magnet 20 are engaged with the projections 18c of the intervenient member 18 even when the intervenient member 18 rotates together with the output shaft 15, so that, there is a play having the predetermined length of L3 between the output shaft 15 and the rotary magnet 20.

The electric motor 1 with the rotation detecting mechanism having the aforementioned structure is mounted, for example, on a power seat apparatus of the automotive vehicle (not shown) in a state where the output gear 16 is connected to the reclining device of the power seat apparatus, the brushes 8, 8 are connected electrically to the external power circuit and the lead wires 21a, 21b of the reed switch 21 are connected to the controller.

When a reclining switch (not shown) is operated, the armature 5 of the electric motor 1 rotates according to the electric supply to the armature coil 6 through the brushes 8, 8 and the commutator 7. By the rotation of the armature 5, rotational force is transmitted to the worm wheel 13 through the worm 5a of the armature shaft 5b and the output shaft 15 rotates together with the output gear 16 and the intervenient member 18 according to the rotation of the worm wheel 13. When the projections 18c of the intervenient member 18 come in contact with the engaging parts 20d of the rotary magnet 20 according to the rotation of the intervenient member 18, the rotary magnet 20 begins to rotate together with the output shaft 15.

When the rotary magnet 20 rotates, the reed switch 21 sences the alteration of the magnetic force generated from the respective poles of the rotary magnet 20 caused by the rotation, and repeatedly switches on and off the electric contact between the lead wires 21a and 21b, whereby a pulse signal is generated from the reed switch 21. The controller recognizes an angle of inclination of the seat back as the number of pulses by counting the number of pulses generated from the reed switch 21 and detects the position of the seat back by the number of pulses recognized. The recognized number of pulses is stored temporary in a predetermined buffer, and stored in a predetermined RAM area of the controller after transferred from the buffer of the RAM area according to the memorizing operation of the switch.

When the electric motor 1 is not in operation, the rotary magnet 20 is so structured as not to rotate substantially by forming the play having the predetermined length of L3 between the rotary magnet 20 and the output shaft 15 even if the output shaft 15 rotates in some degree owing to the play of the output shaft 15 caused by a gap between the output shaft 15 and the worm wheel 13, a backlash formed between the worm wheel 13 and the worm 5a of the armature shaft 5b or a play of the armature shaft 5b in the longitudinal direction. Therefore, the pulse signal is never generated from the reed switch 21 more than one time even if the pulse signal may be generated only one time according to the small turn of the output shaft 15 owing to the play in the output shaft 15, and it is possible to detect the position of the seat back very accurately.

As described above, the electric motor according to this invention is provided with the aforementioned construction, especially with the predetermined play between the rotary magnet and the output shaft, and is so structured that the rotary magnet may not rotate according to the small turn of the output shaft caused by the play of the output shaft. Accordingly, an excellent effect can be obtained in that it is possible to detect the rotation of the output shaft very accurately even if there is the play in the output shaft.

What is claimed is:

1. An electric motor comprising:

a motor case fixed with a field magnet on an inner periphery thereof;

an armature provided with a shaft formed with a worm and rotatably supported in said motor case at one end thereof;

a gear case connected to said motor case and rotatably supporting another end of the shaft of said armature;

a gear cover disposed to cover an opening part of said gear case;

an output shaft rotatably supported in said gear case;

a worm wheel secured to said output shaft and housed in said gear case rotatably to be meshed with the worm formed on the shaft of said armature;

a rotary magnet disposed on said gear cover rotatably about a coaxial line of said output shaft;

a rotation detector for detecting rotation of said output shaft according to alteration of magnetic force caused by rotation of said rotary magnet; and an intervenient member existing between the output shaft and the rotary magnet for forming a predetermined play between said output shaft and said rotary magnet and for transmitting the rotation of the output shaft to the rotary magnet through the play.

2. An electric motor as set forth in claim 1, wherein said predetermined play is larger than a play of the output shaft.

3. An electric motor as set forth in claim 1, wherein said intervenient member is fixed to said output shaft and engaged with said rotary magnet through the predetermined play.

4. An electric motor as set forth in claim 1, wherein said intervenient member is fixed to said worm wheel and engaged with said rotary magnet through the predetermined play.

5. An electric motor as set forth in claim 1, wherein said rotary magnet is provided with an engaging part to be engaged with said intervenient member through the predetermined play.

6. An electric motor as set forth in claim 1, wherein said rotary magnet is provided with a plurality of engaging parts at a predetermined space round the circumference thereof, and said intervenient member is provided with at least one of projection to be engaged with one of said engaging parts of the rotary magnet through the predetermined play in a circumferential direction of the rotary magnet.

7. An electric motor as set forth in claim 1, wherein said gear cover is formed with a magnet supporting shaft, and said rotary magnet is attached rotatably on the gear cover by fitting a wave washer and a stop ring onto the magnet supporting shaft of the gear cover.

8. An electric motor as set forth in claim 1, wherein said intervenient member is formed with an oval shaped hole and said output shaft is formed with an oval cutting part having an oval shaped section to be inserted into the oval shaped hole of said intervenient member.

* * * * *